United States Patent [19]

Takeuchi et al.

[11] Patent Number: 4,746,537
[45] Date of Patent: May 24, 1988

[54] METHOD OF COATING POROUS CERAMIC STRUCTURES WITH γ-ALUMINA

[75] Inventors: Akira Takeuchi; Yukihisa Takeuchi, both of Aichi; Hitoshi Yoshida, Okazaki, all of Japan

[73] Assignee: Nippondenso Co., Ltd., Kariya, Japan

[21] Appl. No.: 73,344

[22] Filed: Jul. 13, 1987

Related U.S. Application Data

[63] Continuation of Ser. No. 815,826, Jan. 2, 1986, abandoned.

[30] Foreign Application Priority Data

Jan. 9, 1985 [JP] Japan ................ 60-2592

[51] Int. Cl.$^4$ .................. B05D 3/06; B05D 7/22
[52] U.S. Cl. .................. 427/37; 427/180; 427/181; 427/199; 427/230; 427/376.2
[58] Field of Search .......... 427/37, 180, 181, 199, 427/230, 237, 376.2; 55/DIG. 5

[56] References Cited

U.S. PATENT DOCUMENTS

| | | | |
|---|---|---|---|
| 3,178,308 | 4/1965 | Oxley et al. | 427/237 |
| 3,635,759 | 1/1972 | Howatt | 427/376.2 |
| 3,925,177 | 12/1975 | Kofoid | 427/37 |
| 3,926,702 | 12/1975 | Oki et al. | 427/230 |
| 3,931,050 | 1/1976 | Asano et al. | 252/462 |
| 4,204,011 | 5/1980 | Tanabe et al. | 427/180 |
| 4,264,346 | 4/1981 | Mann | 428/316 |
| 4,312,899 | 1/1982 | Lahmann | 427/180 |

FOREIGN PATENT DOCUMENTS

| | | | |
|---|---|---|---|
| 854674 | 10/1970 | Canada | 427/180 |
| 882582 | 11/1961 | United Kingdom | 427/37 |

*Primary Examiner*—Sadie L. Childs
*Attorney, Agent, or Firm*—Cushman, Darby & Cushman

[57] ABSTRACT

A method of applying γ-alumina to a porous ceramics structure includes the steps of: causing fine particles of γ-alumina together with a carrier gas to flow through pores in the porous ceramics structure so as to deposit the γ-alumina fine particles on the surfaces of the skeleton of the porous ceramics structure, and heating the structure with the γ-aluminum particles deposited thereto to a predetermined temperature thereby fixing the γ-alumina particles. The fine particles of γ-alumina are formed by causing an arc discharge between the surface of molten aluminum and an aluminum electrode so as to generate vapor of aluminum, and oxidizing the aluminum vapor by an oxidizing gas which may be Ar-$O_2$ carrier gas which is made to flow through the pores in the porous ceramics structure.

5 Claims, 3 Drawing Sheets

METHOD OF COATING POROUS CERAMIC STRUCTURES WITH γ-ALUMINA

This is a continuation of application Ser. No. 815,826, filed Jan. 2, 1986, which was abandoned upon the filling hereof.

BACKGROUND OF THE INVENTION

1. Field of the Invention

The present invention relates to a method of carrying γ-alumina by a porous ceramics structure. More specifically, the invention is concerned with a method for carrying γ-alumina by a porous ceramics structure which is used as a catalyst carrier in an exhaust gas cleaning device for an automotive internal combustion engine or as a fine-particle trapping carrier for trapping fine carbon particles in the exhaust gas from an automotive internal combustion engine.

2. Description of the Prior Art

In a typical conventional method for carrying γ-alumina by porous ceramics structure, the porous ceramics structure is immersed in a colloidal ceramics slurry containing alumina. The ceramics structure is then dried and fired so that the γ-alumina is carried by the skeletal surfaces of the porous ceramics structure.

According to this conventional method, the γ-alumina is carried on the skeletal surface of the porous ceramics structure in the form of a plain thick layer, so that the skeletal surface becomes too smooth to improve the contact between the γ-alumina and a gas to be treated.

SUMMARY OF THE INVENTION

Accordingly, it is a primary object of the invention to provide a method of carrying γ-alumina by a porous ceramics structure, capable of overcoming the above-described problems of the prior art.

In other words, the object of the invention is to provide a method of carrying γ-alumina by a porous ceramics structure which can enhance the contact between the gas to be treated and the γ-alumina carried by the skeletal surface of the porous ceramics structure.

Another object of the invention is to provide a method for carrying γ-alumina on a porous ceramics structure, including a method of producing γ-alumina carried by the skeletal surface of the porous ceramics structure.

DESCRIPTION OF THE PREFERRED EMBODIMENTS

The method of the invention is entirely novel over the conventional method which relies upon immersion of a porous ceramics structure in the alumina slurry.

According to the invention, fine particles of γ-alumina carried by a carrier gas are made to flow through a porous ceramics structure together with the carrier gas, so as to cause deposition of the fine particles of the γ-alumina on the skeletal surface of the porous ceramics structure which deposition occurs in three-dimensional and columnar form.

A description will be made first as to an apparatus which is suitable for use in carrying out the method of the invention.

Figure 1:
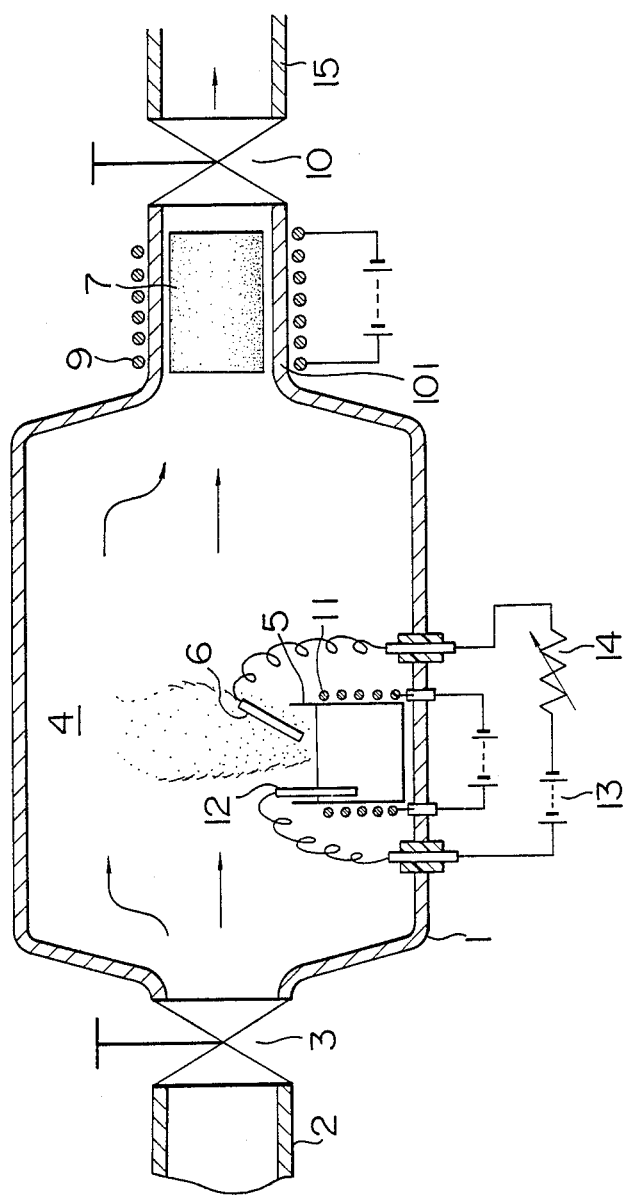
FIG. 1 is a sectional view of an apparatus suitable for use in carrying out the present invention.

Referring to FIG. 1, a crucible 5 of a heat-resistant ceramics material is disposed in a cylindrical, hermetically sealed container 1. A heater coil 111 arranged around the crucible 5 heats the crucible 5 up to a temperature which is high enough to melt aluminum in the crucible 5. The aluminum is molten at a temperature ranging between 800° and 900° C., and the power supply to the heater coil 11 is controlled to maintain the crucible 5 in this temperature range.

An electrode 12 made of a heat-resistant alloy or carbon is immersed in the molten aluminum within the crucible 5. At the same time, an aluminum electrode 6 is supported by a suitable supporting device at a suitable distance, e.g., 2 to 3 mm, from the surface of the molten aluminum.

The electrode 5 and the electrode 12 are connected to a power supply 13 through a variable resistor 14 as illustrated.

The hermetically sealed vessel 1 is connected at its inlet end to an introduction pipe 2 through a magnet valve 3. An air or a mixture gas consisting of argon and oxygen, having oxygen content of 5 to 10%, is introduced into the hermetically sealed vessel 1 through the introduction pipe 2. The pipe 2 is connected to tanks which supplies above-mentioned gases.

The hermetically sealed vessel also is connected at its inlet end to an exhaust pipe 15 through a magnet valve 10. A cylindrical portion 101 for accommodating a porous ceramics structure 7 is formed in the outlet portion of the vessel 1. A heater coil 9 is disposed around the cylindrical, outer peripheral portion 101.

Although not shown, the cylindrical portion 101 is provided with an window which is adapted to be opened and closed for allowing the porous ceramics structure to be removed out of the cylindrical portion 101.

A description will be made hereinunder as to an example of the porous ceramics structure 7.

Figure 2:
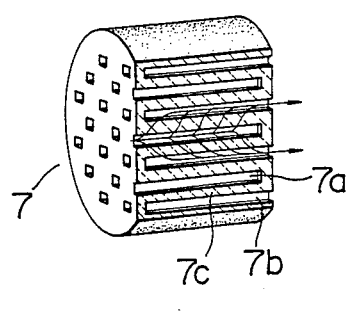
FIG. 2 is a partially-sectioned perspective view of a porous ceramics structure formed in accordance with the method of the invention.
Figure 3:
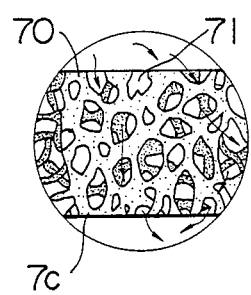
FIG. 3 is an enlarged sectional perspective view of a porous ceramics structure shown in FIG. 2.

Referring to FIGS. 2 and 3, the porous ceramics structure has a multiplicity of inlet passages 7a and outlet passages 7b which are spaced from each other by means of porous partition walls 7c. The porous ceramics structure as a whole has an outside diameter of 107 mm and a length of 78 mm, and each passage has an inside diameter of 2 to 3 mm. There are 50 (fifty) passages in total. This porous ceramics structure can be formed by a method which is disclosed in U.S. continuation-in-part appln. of HIRAYAMA et al. Ser. No. 725,510 filed Apr. 22, 1985, now U.S. Pat. No. 4,662,911 (U.S. Ser. No. 475,745, now abondoned, 1983.3.16).

As will be seen from FIG. 3, the porous partition wall 7c has a three-dimensional network skeleton 70 and pores 71 defined by the skeleton 70. This porous ceramics structure is formed from cordierite.

An embodiment of the method in accordance with the invention will be described hereinunder. Referring first to FIG. 1, a voltage of 30 V is applied between the electrodes 6 and 12 such that an electric current of 10 to 100 A flow therebetween, thereby causing an arc discharge between the surface of the molten aluminum and the electrode 6. On the other hand, a valve 3 and a valve 10 are opened so that a mixture gas mainly consisting of argon and oxygen is introduced into the hermetically sealed container at a flowing velocity of 0.5 m/sec.

By the arc discharge explained above, the molten aluminum is evaporated and the vapor of the aluminum is brought into contact with the argon oxygen mixture gas, so that the aluminum vapor is oxidized to become $\gamma$-alumina ultra-fine particles having particle sizes of about 0.05 $\mu$m. The thus formed ultra-fine $\gamma$-alumina particles are brought to the cylindrical portion 101 of the outlet side of the vessel 1, accompanying the flow of the carrier gas mentioned before. Then, the carrier gas is introduced into the inlet passages 7a of the porous ceramics structure and come into the outlet passages 7b through the pores formed in the partition walls 7c, as indicated by arrows in FIG. 2.

Thus, the carrier gas flows through the pores 71 in the three-dimensional network-like skeleton 70. The ultra-fine $\gamma$-alumina particles are made to collide with the skeleton 70 to be trapped by and deposited on the surface of the skeleton 70. The porous ceramics structure thus having ultra-fine alumina particles deposited thereon is then heated at about 1200° to 1300° C. for about one hour by means of a heater coil 9, so that the ultra-fine alumina particles are fixed onto the skeletal surface. The carrier gas emerging from the porous ceramics structure is exhausted through the exhaust pipe 15.

According to the invention, ultra-fine particles 16 of $\gamma$-alumina are deposited in a three-dimensional porous or columnar porous state on the surface of the above-mentioned skeletal surface 70. In consequence, the contact between the treated gas and the $\gamma$-alumina can be achieved at a high efficiency.

Figure 4:
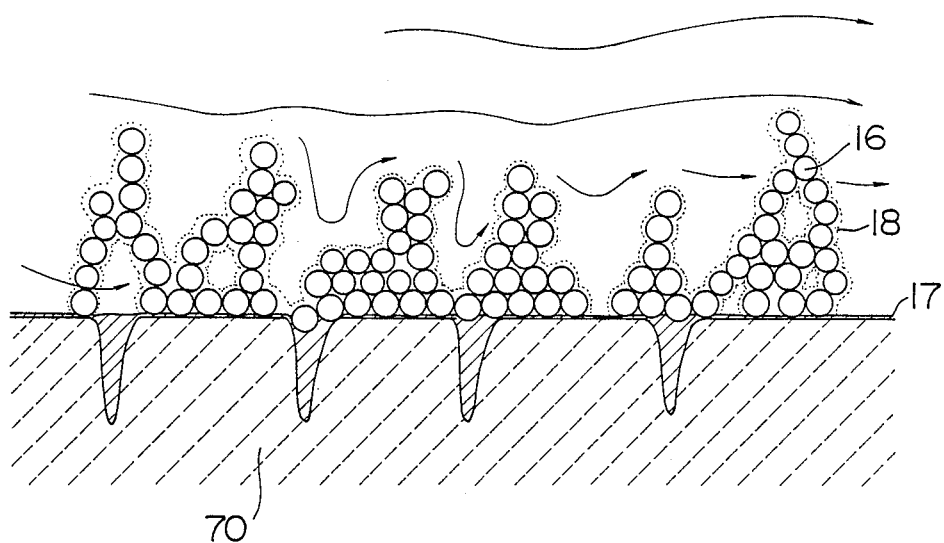
FIG. 4 is a schematic sectional view of the skeletal surface of a porous ceramics structure obtained by carrying out the method of the invention.

Preferably, a film of, for example, cordierite is formed on the porous ceramics structure as indicated by a numeral 17 in FIG. 4, prior to the deposition of $\gamma$-alumina ultra-fine particles. This can be achieved by preparing a cordierite bath which contains, by weight percent with respect to the weight of cordierite, 5 to 10% of polyvinyl alcohol, 2 to 3% of surfactant and dispersing agent, and 50 to 100% of water, immersing the porous ceramics structure in the cordierite bath, and drying the same at 500° to 800° C. followed by firing at 1100° to 1300° C. for 70 hours. With this method, it is possible to prevent the ultra-fine particles 16 from coming into the pores opening in the surface of the skeleton 70, thus preventing wasteful use of the ultrafine alumina particles 16. For carrying a catalyst by the porous ceramics structure on which ultra-fine particles of $\gamma$-alumina are deposited, a solution containing a catalyst is atomized by a spray and applied to the structure while the latter is maintained at a temperature between 500° and 600° C.

An explanation will be made hereinunder as to the results of experiments which were conducted for the purpose of comparison between the method of the invention and the conventional method in the performance.

EXPERIMENT 1

(Specification of Structure Treated by Invented Method)

Using the method of the invention described before, ultra-fine alumina particles (particle size about 0.1 $\mu$m to 1 $\mu$m) were deposited on the skeletal surfaces of a porous ceramics structure as shown in FIGS. 2 and 3 which was formed in accordance with the method disclosed in U.S. Ser. No. 725,510 mentioned before. The amount of deposition was about 150 g for each structure. The structure had an outside diameter of 107 mm, length of 78 mm and a volume of about 700 c.c., while the number of each of the inlet and outlet passage was 50 (fifty) in total. Each passage had an inside diameter of 2 mm and a wall thickness of 2 mm.

(Specification of Structure Treated by Conventional Method)

A slurry was prepared by mixing, by weight percent with respect to the amount of $\gamma$-alumina particles of about 3 $\mu$m in size, 10 to 20% of alumina sol, 20 to 30% of aluminum nitrate, 50 to 60% of colloidal silica and 100 to 150% of water.

The porous ceramics structure, which was formed by the method disclosed in U.S. Ser. No. 725,510 and having the same size as the structure used in the method of the invention, was immersed in the slurry and, after removal of excessive slurry, the porous ceramics structure was fired for one hour at a temperature of between 500° and 1000° C., thereby forming an $\gamma$-alumina layer of about 150 g in weight on the skeletal surface of the porous ceramics structure.

(Carriage of Catalyst Metal)

The following method was used in carrying a catalyst metal both on the porous ceramics structure treated by the method of the invention and the porous ceramics structure treated by the conventional method.

An aqueous solution of chloroplatinic acid ($H_2PtC_{16}.6H_2O$) and rhodium chloride ($RhC_{13}.3H_2O$) was prepared such that the ratio of weight between the chloroplatinic acid and rhodium chloride ranges between 5:1 in terms of the weight of platinum and rhodium (Pt:Rh), and that the total weight of the chloroplatinic acid and the rhodium chloride is in a range of 1 to 3 wt % of the whole solution.

The porous ceramic structures were immersed in this aqueous solution and, after a slight drainage, dried at a temperature ranging between 100° and 120° C. Consequently, a catalytic metal consisting of Pt-Rh is carried by the surfaces of the $\gamma$-alumina on the porous ceramics structure. The catalytic metal is denoted by a numeral 18 in FIG. 4 which shows the structure treated by the method of the invention.

The porous ceramics structure carrying catalytic metal was mounted in an exhaust pipe of an automobile COLLORA manufactured by TOYOTA, and was subjected to a test known as 10-mode running pattern test specified by a regulation laid by Ministry of Transportation of Japan.

Figure 5:
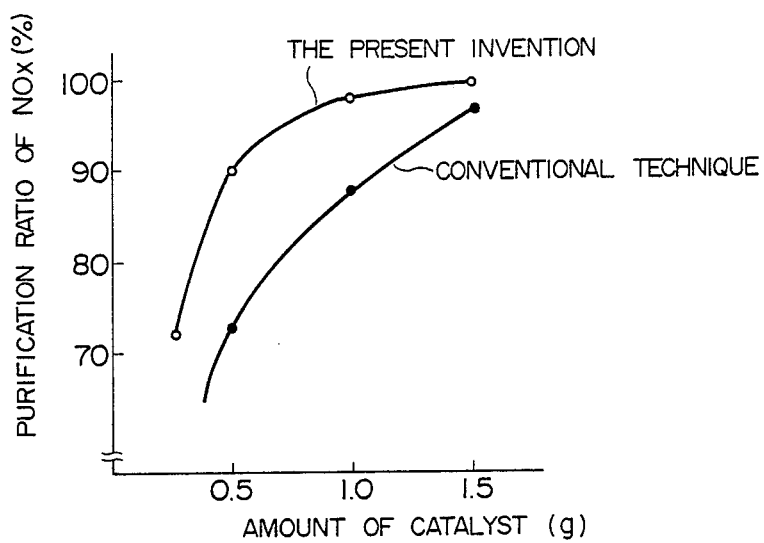
FIG. 5 is a graph showing the relationship between the amount of catalyst used and NOx removing effect in the porous ceramics structure produced by the method of the invention as compared with one produced by a conventional method.

The result of measurement of the exhaust gas cleaning effect throughout this test are shown in FIG. 5. FIG. 5 shows only the effect of removal of NOx. The results of measurements of cleaning effects on CO and HC are omitted, because they showed almost the same tendency as the effect on NOx.

From FIG. 5, it will be clearly understood that the porous ceramics structure in accordance with the invention has much higher NOx removing effect than the porous ceramics structure treated by the conventional method and having the same amount of catalyst metal. This proves that the efficiency of contact between the γ-alumina and the exhaust gas is higher in the structure treated by the method of the invention than in the structure treated by the conventional method. It will be understood also that the method of the invention permits a remarkable reduction in the consumption of the catalyst metal as compared with the conventional method.

EXPERIMENT 2

(Specification of Structure Treated by Invented Method)

Porous ceramics structures were prepared by the same method as in Experiment 1. The structure had an outside diameter of 107 mm, length of 130 mm and a volume of 1170 c.c. There were 89 (eighty-nine) inlet passages and 88 (eighty-eight) outlet passages each having an inside diameter of 3 mm. The thickness of the partition wall also was 3 mm. Each porous ceramics structure carried about 200 g of γ-alumina.

(Specification of Structure Treated by Conventional Method)

A porous ceramics structure fabricated by the method disclosed in U.S. Ser. No. 725,510 was used. The sizes of this structure were identical to those of the structure treated by the method of the invention mentioned above.

The porous ceramics structure treated by the method of the invention and that terated by the conventional method were subjected to a test for measurement of the efficiency of trapping diesel particulate. The test was conducted by mounting the structures in the exhaust pipe of a TOYOTA's 2600 c.c. diesel engine for passenger car CROWN, and measuring the effect of trapping of diesel particulate after 3-hours running at 2000 r.p.m.

Figure 6:
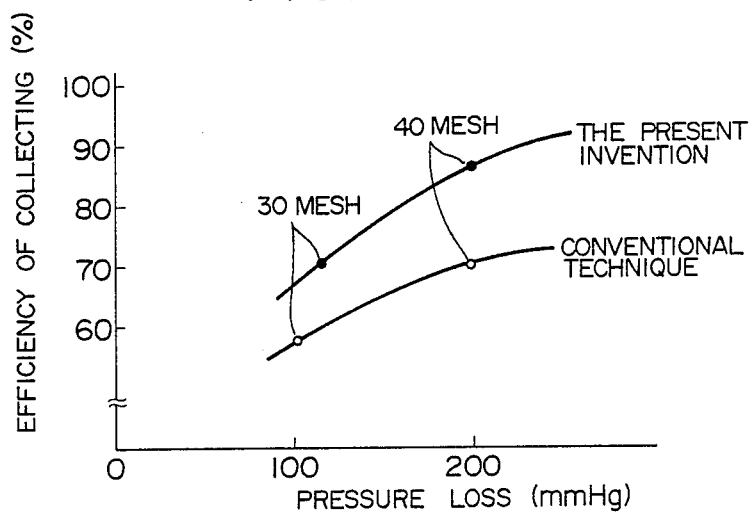
FIG. 6 is a graph showing the relationship between the pressure drop and the particulate trapping efficiency in the porous ceramics structure of the invention in comparison with that in the conventional method.

The result of measurement is shown in FIG. 6. In this Figure, the term "mesh" is used to mean the total number of pores in the porous ceramics structure as counted per inch when the pores are arrayed in a line.

From FIG. 6, it will be seen that the porous ceramics structure of the invention provides a higher diesel particulate trapping efficiency as compared with the conventional method.

The γ-alumina used in the method of the invention can be formed by various methods, e.g., by hydrolysis in water or by evaporation in a gas.

It is to be noted also that the invention is applicable also to the carriage of catalyst on an ordinary monolithic structure which is known per se.

What is claimed is:

1. A method of coating a porous ceramics structure with γ-alumina comprising the steps of: generating an arc discharge between the surface of aluminum in molten state and an aluminum electrode so as to generate aluminum vapor; oxidizing said aluminum vapor to form fine particles of γ-alumina; causing both the γ-alumina fine particles and a carrier gas comprising an oxidizing gas containing oxygen to flow through pores of said porous ceramics structure so that said γ-alumina fine particles are deposited in three-dimensional and columnar form on the surface of the skeleton of said structure around said pores; and heating said structure with said γ-alumina fine particles deposited thereto to a predetermined temperature thereby fixing said γ-alumina fine particles to the surface of said skeleton.

2. A method of coating a porous ceramics structure according to claim 1, wherein said porous ceramics structure has a multiplicity of inlet passages, multiplicity of outlet passages and partition walls by which said inlet and outlet passages are separated from each other.

3. A method of coating a porous ceramics structure according to claim 2, wherein said partition wall is constituted by a three-dimensional network-type skeleton and pores defined by said skeleton.

4. A method of coating a porous ceramics structure according to claim 3, wherein said oxidizing gas is air or a mixture gas containing mainly argon and oxygen.

5. A method of coating a porous ceramics structure according to claim 3, wherein a thin ceramics film is formed on the surface of said skeleton and which also fills the pores existing on the surface of said skeleton.

* * * * *